No. 661,968. Patented Nov. 20, 1900.
B. A. FISKE.
COMBINED RANGE FINDER AND TURRET.
(Application filed June 28, 1900.)
(No Model.) 2 Sheets—Sheet 1.
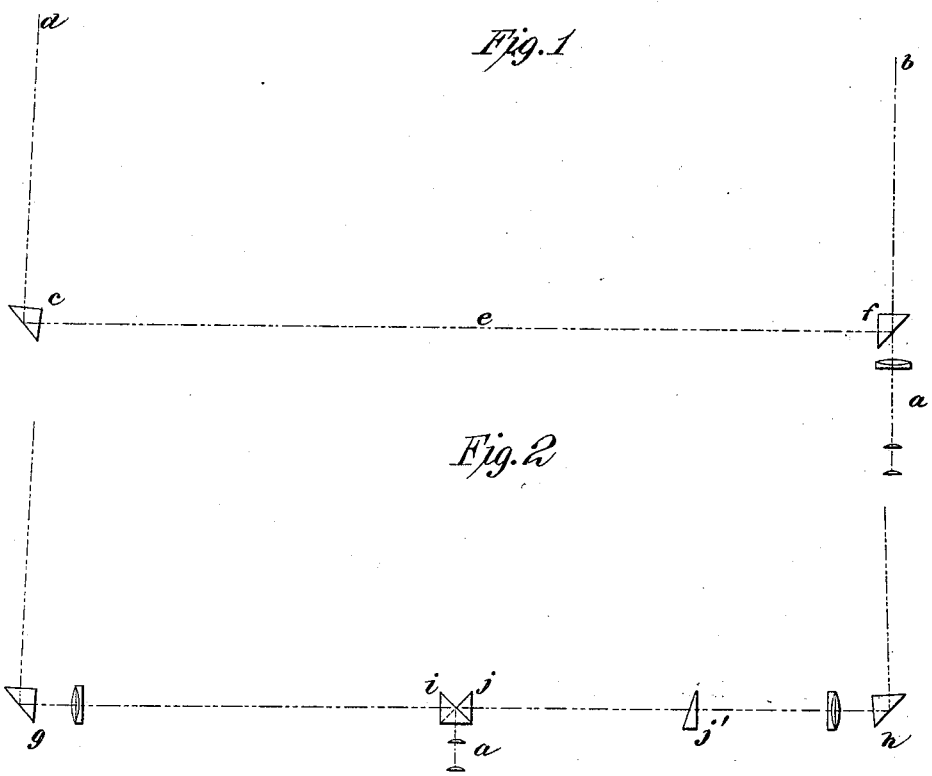
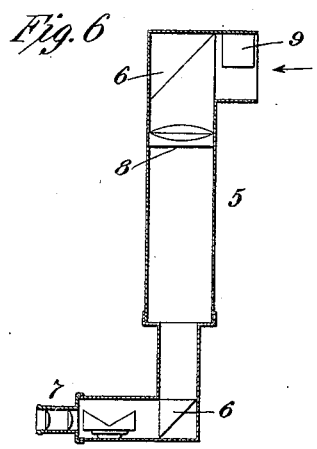
Witnesses:
Inventor
Bradley Allan Fiske
by Dyer Edmonds & Dyer
Att'ys.

No. 661,968. Patented Nov. 20, 1900.
B. A. FISKE.
COMBINED RANGE FINDER AND TURRET.
(Application filed June 28, 1900.)
(No Model.) 2 Sheets—Sheet 2.
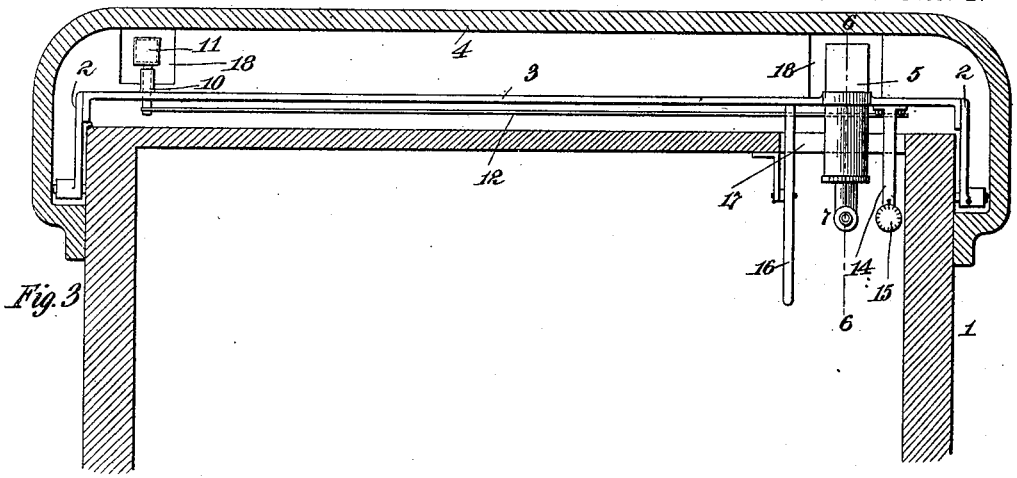
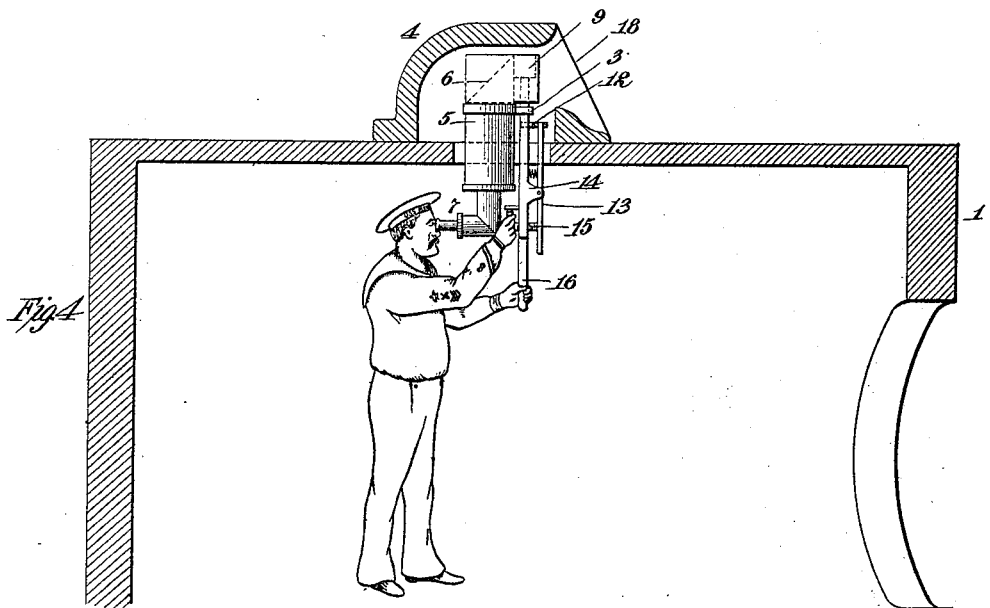
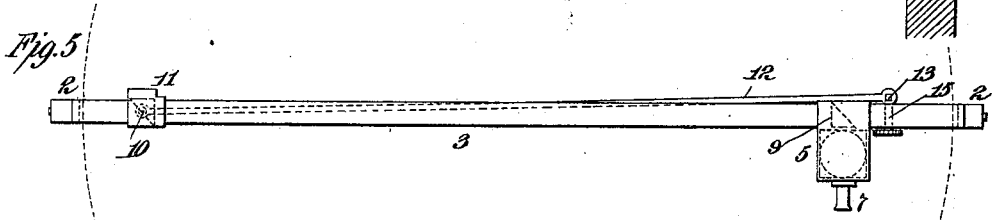
Witnesses: Inventor
Bradley Allan Fiske
by
Dyer Edmonds & Dyer
Att'ys.
THE NORRIS PETERS CO., PHOTO-LITHO., WASHINGTON, D. C.

UNITED STATES PATENT OFFICE.

BRADLEY ALLAN FISKE, OF NEW YORK, N. Y.

COMBINED RANGE-FINDER AND TURRET.

SPECIFICATION forming part of Letters Patent No. 661,968, dated November 20, 1900.

Application filed June 28, 1900. Serial No. 21,869. (No model.)

*To all whom it may concern:*

Be it known that I, BRADLEY ALLAN FISKE, a citizen of the United States, residing in the borough of Manhattan, city of New York, State of New York, have invented a certain new and useful Combined Range-Finder and Turret, of which the following is a description.

My invention relates to a combined range-finder and turret, the turret supporting and offering protection to the range-finder and by its rotation directing the observing device of the range-finder toward the target. The range-finder which is combined with the turret may be of any desired optical type wherein the range is ascertained by a determination of the angles of a known base-line with respect to the target. These range-finders at the present time are divided into two general classes, the first employing a single telescope arranged at one end of the known base-line and through which the target is observed directly and a reflector at the other end of the base-line by which rays from the target are reflected to a second reflector carried by the telescope immediately in front of its object-glass, so that by properly adjusting the first reflector the direct and reflected rays entering the objective of the telescope may be vertically alined. Obviously the extent of adjustment required to aline the two images determines the angle at the object which the known base-line subtends, so that by properly graduating the adjusting mechanism the range or distance of the object can be immediately ascertained. In the second class of range-finders a reflector is employed at each end of the base-line, the telescope being generally centrally mounted with respect to the same and receiving reflected images of the target from both reflectors. Any convenient arrangement, such as a prism or other optical devices for suitably refracting the rays, is employed, whereby the two images may be alined, the position to which said refracting devices require to be moved to aline the images offering a basis for an immediate calculation of the distance of the object.

Up to the present time range-finders of the class referred to have not proved entirely practicable, for the reason that owing to the small base-line used—*i. e.*, the distance separating the two reflecting-surfaces—the angle between the two rays is small and considerable magnification is required, resulting in loss of light and great vibration of the reflected images unless the ship and platform be absolutely steady. Furthermore, the shortness of the base-line employed results in only a slight angle between the two rays, so that opportunity for error is present. Up to the present time the provision of a long base-line has not been possible with instruments of this type owing to lack of deck-space on shipboard. Aside from the optical difficulties referred to, the use of these range-finders for naval purposes has been objectionable, for the reason that in order to protect them from the blast and concussion of the heavy guns they have had to be employed above deck, generally in the fighting-top, and therefore unnecessarily exposing the operators to the fire of the enemy.

By means of my present invention the difficulties referred to are entirely overcome, as I am enabled to use a long base-line, while at the same time the apparatus itself is not only protected from the effect of the guns, both of the enemy and of the ship on which it is used, but the operator is absolutely safe and can handle the instrument with steadiness and coolness.

Briefly stated, my invention consists in combining an optical range-finder with a revolving turret, either of a vessel or of a land fortification, in such a way that the turret forms the support for the instrument, revolves it to the proper position for observing the target, and effectively protects both the instrument and the operator from the effect of shot and shell.

In order that my invention may be better understood, attention is directed to the accompanying drawings, forming part of this specification, in which—

Figure 1 is a diagram illustrating the operation of range-finders of the first-class above referred to, wherein the telescope is mounted at one end of the base-line; and Fig. 2, a corresponding view illustrating the operation of range-finders of the second-class, wherein the telescope is centrally arranged with respect to the base-line and a reflector is employed at each end of the base-line. Fig. 3 is a vertical sectional view through a ship's turret, showing the preferred embodiment of my invention applied thereto; Fig. 4, a section taken at right angles to Fig. 3; Fig. 5, a plan view with the protecting-armor for the device removed, and Fig. 6 a section on the line 6 6 of Fig. 3.

In all of the above views corresponding parts are represented by the same letters and numerals of reference.

Before referring to the mechanical construction of my improved device the general construction and operation of the optical range-finders of the type which I prefer to employ may be explained.

In Fig. 1, $a$ represents a telescope having a large object-glass and which is trained directly upon the target, the direct rays being represented by the line $b$. A reflector $c$, generally in the form of a prism, is carried on the base which supports the telescope and receives the direct rays $d$ from the target. The rays $d$ are reflected at $e$ to a reflector $f$, so that a reflected image of the target will be also projected through the object-glass. The distance separating the reflecting-surfaces of the reflectors $c$ and $f$ and represented by the line $e$ constitutes the known base-line. By shifting the angle of the reflector $c$ the reflected and direct images may be brought into alinement within the objective, and by noting the angle of the reflector $c$ the range or distance of the object can be immediately ascertained.

In Fig. 2 there are two reflectors $g$ and $h$ at the two ends of the base-line and two intermediate reflectors $i$ and $j$, by which the rays from the target may be reflected to the eyepiece of the telescope $a$, which with this form of device is generally centrally located between the reflectors $g$ and $h$. The two objectives are located usually between the two systems of reflectors, as shown, and the reflectors $i$ and $j$, as is well known, are constructed to reinvert the images. Any suitable form of prism, such as $j'$, or other optical device is used for refracting the rays from the target, so that the images projected into the eyepiece will be brought into alinement, and the position to which the refracting device requires to be moved to effect this result indicates the range or distance of the target.

I shall describe my improved range-finder as being of the type shown in Fig. 1, wherein the telescope $a$ will be located at one side of the turret; but it will be of course obvious that without the exercise of invention the improvements may be applied to range-finders of the type shown in Fig. 2, wherein the telescope will be centrally located within the turret or to range-finders of other types.

1 represents a turret, either of a naval vessel or of a land fortification, which is provided with the usual and appropriate mechanism for revolving it, so that the gun or guns therein may be pointed at the target. Pivoted either to the outside or to the inside walls of the turret are two arms 2 2, which carry a cross-bar 3 at their upper ends, said cross-bar working as closely to the top of the turret as is practicable. In order to protect the apparatus, an armor-plate 4 of the desired thickness may be secured to the top of the turret, so as to inclose both the cross-bar 3 and the arms 2 2 when the latter are pivoted to the outside of the turret, as shown. Rigidly carried by the cross-bar 3 is a telescope 5, preferably of the type described and claimed by me in my application for Letters Patent filed May 5, 1900, Serial No. 15,563, and shown more clearly in Fig. 6, said telescope having two reflecting-surfaces 6 6, arranged as shown, whereby a ray of light entering in the direction indicated by the arrow may be deflected vertically downward and thence horizontally through an eyepiece 7, whereby the operator within the turret may observe the target outside of the same. The objective 8 of the telescope 5 is of a large size, and carried in front thereof is a mirror or prism 9, arranged as shown, whereby direct rays may enter the objective above or below the prism or mirror 9, while reflected rays from said prism or mirror may enter the objective above or below the directly-entering rays, as the case may be. The mirror or prism 9 is rigidly supported by the telescope, and its reflecting-surface is arranged at an angle of forty-five degrees to the plane of the upper mirror 6. Carried by the bar 3 on a pivot 10 is a mirror or prism 11, arranged in the same plane as the reflecting-surface 9, whereby a ray of light striking the reflecting-surface 11, as shown, will be deflected horizontally to the mirror or prism 9 and thence into the telescope. The distance separating the reflecting-surfaces 9 and 11, respectively, is the known base-line of the instrument, which obviously is of very much greater length than with the ordinary range-finders of the type referred to. In order to properly adjust the reflecting-surface 11 to bring into alinement the direct and reflected rays entering the objective of the telescope, I prefer to connect a lever 12 to the pivot 10 and to engage with said lever a vertically-pivoted adjusting-lever 13, the pivot for which is carried on a downwardly-extending arm 14, connected to the cross-bar 3. In order to regulate the position of the adjusting-lever 13, an adjusting-screw 15 may be employed having a suitable scale on its head, whereby by rotating said adjusting-screw the levers 12 and 13 may be moved to delicately shift the position of the mirror 11, and to thereby bring into vertical alinement the direct and reflected images of the target in the eyepiece of the telescope, as will be understood. By observing the position of the adjusting-screw a visual indication of the range will be secured. In order to maintain the object in the field of the telescope as well as in the field of the reflecting-surface 11, notwithstanding the rolling of the vessel on which it may be employed, I provide a hand-lever 16, which is connected to the cross-bar 3 and which works through a slot 17 in the top of the turret, whereby said lever may be easily grasped by the hand of the operator as he stands observing the object through the telescope, so that by shifting the position of said hand-lever the telescope may be maintained in its desired verticality to be always trained on the target, it being obvious, of course, that the horizontal adjustment of the telescope is effected by the turning of the turret as the guns therein are trained on the object to be hit. It will of course be understood that when the supplemental armor 4 is used for protecting the range-finder it will be provided with openings 18 therein opposite to the objective of the telescope and to the reflecting-surface 11, and through which openings the target will be observed directly and indirectly in the operation of the range-finder.

It will be observed that by pivoting the cross-bar 3 on the ends of the arms 2 2 the pivots of said arms are substantially in line with the eyepiece of the telescope and at the height of the eye of an ordinary-sized man. Hence the adjustments of the bar to maintain the telescope trained on the target do not effect a substantial movement of the eyepiece of the telescope, which remains, therefore, relatively fixed in space. This is of great importance in the practical use of the instrument, for the reason that the operator does not require to keep moving his head in order to maintain his eye at the eyepiece.

Having now described my invention, what I claim as new, and desire to secure by Letters Patent, is as follows:

1. The combination with a revolving turret, of an optical range-finder carried thereon and constituting a permanent fixture thereof, whereby the range-finder will be trained on the target by the rotation of the turret, said range-finder comprising a telescope and two reflectors, said reflectors being secured at approximately the opposite ends of a diameter of the turret, which diameter thereby constitutes the base-line of the finder, and means for vertically alining the rays which come from a distant object to said opposite ends of the base-line, substantially as set forth.

2. The combination with a revolving turret, of a range-finder carried thereby and comprising a telescope, the eyepiece of which is out of line with its objective, and through which the target is observed directly by the observer within the turret, a reflector mounted opposite said telescope and by means of which a reflected image of the object will be observed through the telescope, and means for alining the direct and reflected rays, substantially as set forth.

3. The combination with a revolving turret, of a range-finder carried thereby and comprising a telescope the eyepiece of which is out of line with its objective, said telescope being mounted near one side of the turret and through which the target is observed directly by the observer within the turret, a reflector mounted opposite said telescope and by means of which a reflected image of the object will be observed through the telescope, and means for adjusting the angle of said reflector, substantially as set forth.

4. The combination with a revolving turret, of a cross-bar pivoted thereon, a telescope carried by said bar, through which the target is observed directly, a reflector carried by the bar diametrically opposite to the telescope and through which a reflected image of the target is observed, means for adjusting the angle of said reflector, and means for manually rotating the cross-bar around its pivot, substantially as set forth.

5. The combination with a revolving turret, of a cross bar pivoted to said turret, a vertical telescope carried by the cross-bar and projecting downward into the turret, a reflector carried by said telescope, a reflector carried by the cross-bar at its opposite end from the telescope, and means for adjusting the angle of the latter reflector, substantially as set forth.

6. The combination with a revolving turret, of a cross-bar pivoted to said turret, a vertical telescope carried by the cross-bar and projecting downward into the turret, a reflector carried by said telescope, a reflector carried by the cross-bar at its opposite end from the telescope, and a lever connected to the pivot of the latter reflector by means of which its angle may be adjusted, substantially as set forth.

7. The combination with a revolving turret, of a cross-bar pivoted to said turret, a vertical telescope carried by the cross-bar and projecting downward into the turret, a reflector carried by said telescope, a reflector carried by the cross-bar at its opposite end from the telescope, a lever connected to the pivot of the latter reflector by means of which its angle may be adjusted, and an adjusting-lever coöperating with the said lever for adjusting the position of the latter, substantially as set forth.

8. The combination with a revolving turret, of a cross-bar pivoted to said turret, a vertical telescope carried by the cross-bar and projecting downward into the turret, a reflector carried by said telescope, a reflector carried by the cross-bar at its opposite end from the telescope, a lever connected to the pivot of the latter reflector by means of which its angle may be adjusted, an adjusting-lever coöperating with said lever for adjusting the position of the latter, and an adjusting-screw for adjusting the position of the adjusting-lever, substantially as set forth.

9. In a range-finder, an observing-telescope movable relatively to a fixed pivot, with the eyepiece of the telescope in approximately the line of said pivot, whereby the adjustment of the telescope to maintain an object in the field of view does not effect a relative movement of the eyepiece, substantially as and for the purposes set forth.

This specification signed and witnessed this 22d day of June, 1900.

BRADLEY ALLAN FISKE.

Witnesses:
FRANK L. DYER,
JNO. R. TAYLOR.